INVENTOR.
GLEN P. HUPPKE
ATTORNEYS 3,332,214
METHOD AND APPARATUS FOR COLLECTING CONTAMINANTS FROM GASES
Glen P. Huppke, Beaver Falls, N.Y., assignor to National Dust Collector Corporation, Chicago, Ill., a corporation of Illinois
Filed Nov. 10, 1965, Ser. No. 507,165
4 Claims. (Cl. 55—90)

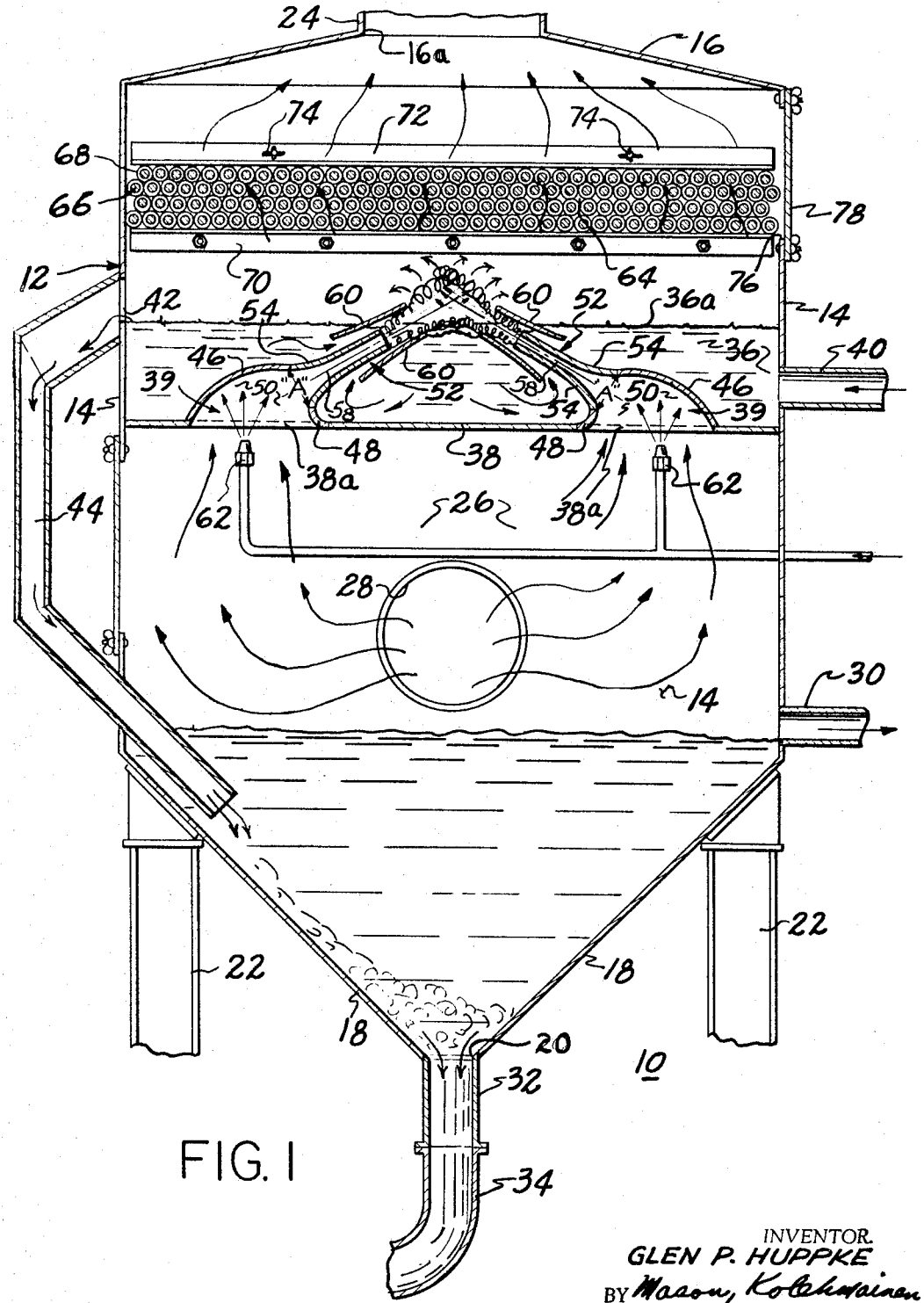
FIG. I

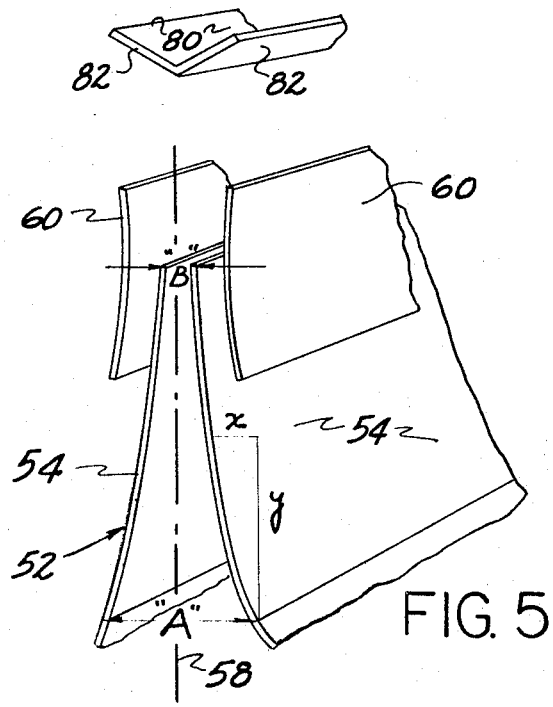
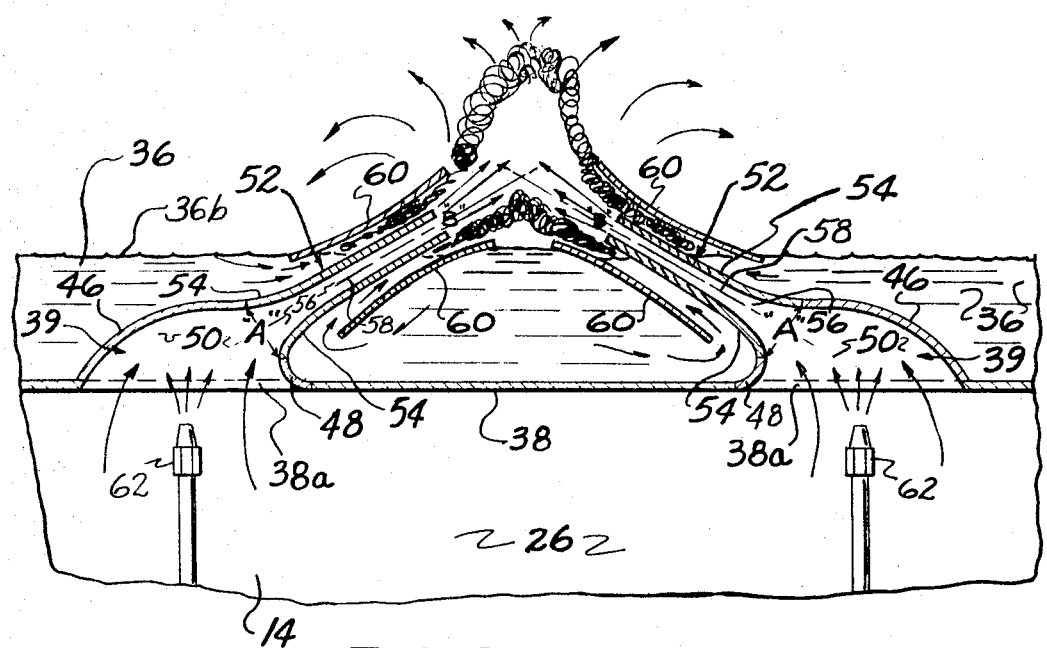

The present invention relates to a new method and apparatus for collecting contaminants from gases and, more particularly, relates to a new and improved method and apparatus for removing solid contaminants, such as dust particles and the like, from gases, such as air and flue gases and the like.

Many types of industrial gas cleaning devices are presently available for removing contaminants, such as small dust particles, from a gas stream. Some of these devices are classed as inertial-type cleaners because inertial forces acting on the particles are utilized to physically separate the particles from the gas stream in which they are suspended and carried. Other types of gas cleaners operate with a liquid cleaning medium which entraps the contaminants within the medium by diffusion and impingement of the contaminant particles on wetted films of the liquid medium. The present invention relates generally to the latter type of gas cleaning devices and provides a new and unique method of removing the contaminants from a gaseous medium in a highly efficient manner.

It is therefore an object of the present invention to provide a new and improved method of removing contaminants from a gaseous medium.

Similarly, it is an object of the present invention to provide a new and improved apparatus for removing contaminants from a gaseous medium.

More specifically, it is an object of the present invention to provide a new and improved method of removing contaminants from a gaseous medium wherein the gas is formed into one or more high velocity jets or streams and a contaminant collecting liquid medium is introduced by venturi action into the streams or jets to collect and entrap the contaminants or dust particles.

Another object of the present invention is the provision of a new and improved method of removing contaminants from a gaseous medium as described in the foregoing object, wherein the liquid medium is introduced in the streams adjacent the region of highest velocity, therein providing a maximum differential velocity between the gas and the particles or droplets of liquid entrained therein.

Still another object of the invention is to provide a new and improved method of removing contaminants from a gaseous medium wherein two high velocity jets or streams of gas are directed on crossing, convergent paths so that contaminant particles and liquid droplets or particles in one stream collide with those in the converging stream.

Yet another object of the present invention is the provision of a new and improved method of removing contaminants from a gaseous medium wherein the gas is formed into one or more high velocity streams and a contaminant collecting liquid medium is introduced into the streams or jets in a manner forming large envelopes of intensely mixed liquid and gas particles which surround and envelop the gas streams.

Still another object of the present invention is the provision of a new and improved method of removing contaminants from a gaseous medium as described in the preceding object, wherein the liquid gaseous envelopes around two gas streams are directed to directly collide with one another.

Another object of the present invention is the provision of a new and improved apparatus for removing contaminants from a gaseous medium including nozzle means for directing the gas into one or more high velocity jets and means for entraining contaminant containing liquid medium into the streams by venturi action to provide intense mixing between the gas and liquid to entrap and collect the contaminants within the liquid medium.

Another object is the provision of new and improved apparatus of the type described wherein the liquid medium is supplied from a liquid bath for entrainment within the streams at the region of maximum velocity adjacent the outlet of the nozzle means.

Another object of the present invention is the provision of new and improved apparatus of the type described wherein the outlets of the nozzles are positioned below the upper level of the liquid in the bath.

Yet another object of the present invention is the provision of a new and improved apparatus for removing contaminants from a gaseous medium wherein liquid eductor means are provided adjacent the outlet of the nozzles and extending below the upper level in the liquid bath for guiding and directionalizing the liquid flow into the gas streams to form enlarged gaseous liquid envelopes extending upwardly from the nozzle outlets.

Still another object of the present invention is the provision of a new and improved apparatus for removing contaminants from a gaseous medium wherein a pair of nozzle means are provided for directing the gas in high velocity streams and the nozzles are directed on converging paths whereby the liquid and gas in each stream collide with the converging stream above the liquid bath.

The foregoing and other objects and advantages of the present invention are accomplished by the provision of a new and improved method of collecting contaminants from a gaseous medium comprising the steps of moving the gas into a high velocity stream and introducing a contaminant collecting liquid medium into the gas flow by venturi action and thereby developing an intimate mixture of finely divided liquid droplets and gas whereby the contaminants are entrapped and collected in the liquid medium. The mixture of gas and liquid forms expanding envelopes having large surface contact areas between the liquid and gas whereby the contaminant particles are in contact with finely divided liquid particles and are entrapped and collected thereby. The contaminant containing liquid is removed continually and replenished with fresh liquid.

In one embodiment, apparatus of the present invention comprises a housing defining a flow path for the gas and having a lower inlet and an outlet for removal of the cleansed gas. A pair of converging nozzles are provided within the housing between the inlet and outlet to form a pair of high velocity gas streams directed to collide with one another. Liquid medium for collecting the contaminants is supplied from a liquid bath located in the housing between the inlet and outlet and surrounding the nozzles. Liquid from the bath is entrained into the gas streams flowing in the nozzles by venturi action and is intimately mixed therewith. Preferably, the outlets of the nozzles are positioned below the upper level of the liquid in the bath and as the contaminated gases move upwardly through the outlets of the nozzles and are accelerated into high velocity streams, liquid from the bath is entrained within the gas streams adjacent the outlets forming upwardly extending envelopes of intensely mixed gas and liquid particles whereby the contaminants in the gas are entrapped and collected in the liquid. In order to guide and directionalize the flow of liquid from the bath into the gas streams, liquid eductor means are provided on opposite sides of the nozzles adjacent their outlets. The lower portions of the eductor vanes extend below the upper level in the liquid bath and aid in producing the enlarged liquid-gaseous envelopes which are formed above the nozzle outlets. The envelopes of adjacent nozzles are directed to converge with one another, and the liquid and contaminant particles therein collide with one another in an intense turbulent action wherein the contaminants are wetted and entrapped in the liquid droplets which drop back into the liquid bath and are carried away.

For better understanding of the present invention, reference should be had to the following detailed description taken in conjuntcion with the drawings, in which:

FIG. 1 is a cross-sectional view of one embodiment of a new and improved apparatus for collecting contaminants from gas, constructed in accordance with the present invention;

FIG. 2 is an enlarged detailed fragmentary sectional view of another embodiment of the present invention having slight modifications from the embodiment of FIG. 1;

FIG. 5 is a fragmentary perspective view of another embodiment of a nozzle, liquid eductor, and deflecting baffle constructed in accordance with the present invention.

Figure 4:
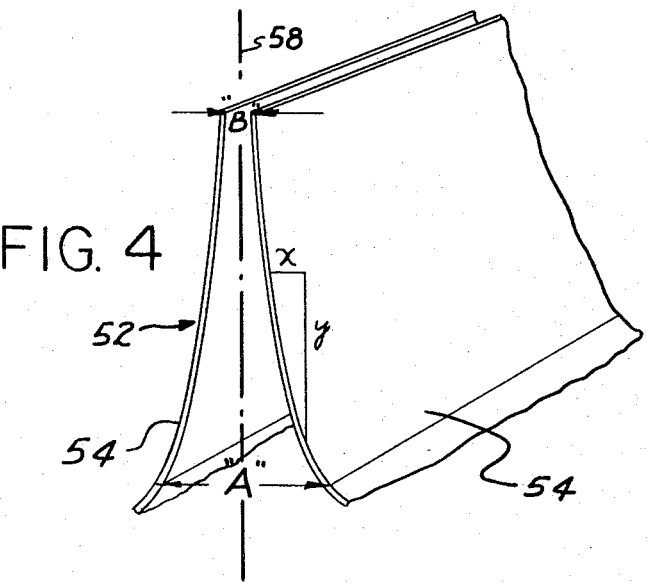
FIG. 4 is a fragmentary perspective view of the nozzles alone.

Referring now, more specifically, to the drawings, therein is illustrated in FIG. 1 a dust collector for removing contaminants from gas constructed in accordance with the present invention and referred to generally by the reference numeral 10. The dust collector 10 includes a housing 12 having upstanding sidewalls 14, a top wall 16, and inwardly sloping lower sidewalls 18 which converge toward an outlet 20 in the lower portion of the housing. The housing 12 is supported by a plurality of legs 22 attached to the lower sidewalls 18, and the upper end of the housing includes an upper discharge outlet 16a formed in the top wall 16 and connected to an outlet duct 24 for discharging the cleaned gases.

Contaminated gases to be cleaned are introduced into the lower end of the housing 12 through an opening 28 formed in one of the sidewalls 14 to move upwardly through the housing and, after cleaning, pass out of the housing via the outlet duct 24. Suitable fan means (not shown) are provided in the outlet duct 24 or on the inlet side to move the gases through the housing.

The walls 18 form a liquid collecting sump below the inlet 28, and the liquid collected in the sump passes out the drain 20 through a drain fitting 32 connected to a sludge line 34 running to a settlement chamber (not shown) or sewer drain. The liquid collected in the sump carries out the contaminants collected from the gas and an overflow drain 30 is provided to prevent the liquid level from rising too high, should the drain outlet or sludge line become clogged.

A liquid bath 36 is maintained in the housing between the inlet 28 and upper outlet 16a by means of a transversely extending wall or liquid pan 38 secured to the sidewalls 14. Fresh liquid is supplied to the bath by a supply line 40 and the upper level 36a of the bath is maintained by an overflow opening 42 formed in one of the sidewalls 14. Contaminant containing liquid passes through the overflow opening 42 and is directed downwardly into the lower end of the housing through a drain line 44 having a lower open end. The collected contaminants and sludge flowing through the line 44 eventually settle toward the bottom of the sump for discharge through the outlet 20 and sludge line 34.

In order to direct the contaminanted gases in the chamber 26 upwardly into the liquid bath 36, the pan 38 is provided with a pair of spaced-apart elongated openings 38a which are longitudinally parallel to one another, and the gases moving through the openings 38a are directed inwardly and upwardly on crossing, convergent paths by a pair of transition ducts 39. Each transition duct comprises a large curved sidewall 46, an opposite smaller curved sidewall 48, and a pair of opposite end walls 50. The openings 38a in the pan 38 form enlarged inlet mouths for the transition ducts because the lower edges of the walls 46 and 48 are joined to the longitudinal edges of the openings 38a while the lower edges of the end walls 50 are joined to the short transverse edges of the openings 38a. The upper portions of each pair of transition sidewalls 46 and 48 converge toward one another forming outlets at the upper ends of the transition ducts somewhat smaller in transverse dimension than the width of the openings 38a in the pan 38. Accordingly, the velocity of the gas moving upwardly in the transition ducts is increased because of the diminishing cross-sectional flow area.

The upper outlets of the ducts are connected to the bases or inlets of a pair of converging nozzle structures 52. Each nozzle structure 52 comprises a pair of inwardly curved, spaced-apart, converging sidewalls 54 and a pair of opposite end walls 56. The bases or inlet ends of the walls 54 of each nozzle structure are spaced apart by a distance A (FIGS. 3, 4, and 5), and the walls curve gently inwardly toward one another to a minimum spacing or transverse dimension B forming an upper elongated slot or outlet opening. As the gases move through the nozzles 52 between the converging sidewalls 54 thereof, the flow velocity is smoothly increased and accelerated to a maximum value at the outlet slots. The outlets of the nozzles are slightly below the upper level 36a of the liquid collecting medium in the liquid bath 36, and the high velocity gas streams moving through the slots come in direct contact with the liquid in the bath.

Because the gas streams leaving the outlets of the nozzle structures 52 are at maximum velocity, the static pressure of the gas is reduced substantially and quantities of the liquid in the bath are drawn into the gas streams in a venturi-type action. The liquid and gases are intimately mixed in the region around the outlets and the gaseous-liquid admixture formed thereby extends upwardly from the nozzle outlets forming envelopes of intensely mixed gas and liquid surrounding the gas streams. The gases in the streams tend to expand after leaving the fixed walls 54 of the nozzles, and the gaseous-liquid envelopes function as divergent wall portions of a venturi and, in effect, complement the converging fixed walls 54 of the nozzle structures. The expanding gases near the center of the gas streams move outwardly into and through the gaseous-liquid envelopes, and the contaminants and dust particles in the gases are wetted and collected in the liquid films and bubbles formed in the water wall-like envelopes.

Each of the nozzle structures 52 and its corresponding gaseous-liquid envelope forms a venturi-like section with the convergent wall portion of the venturi provided by the fixed nozzle walls 54 and the divergent wall portion of the venturi provided by the expanding semi-liquid walls of the gaseous-liquid envelopes. Accordingly, a maximum amount of mixing of the gases and liquid medium is accomplished because of the relatively large areas of contact between the gas in the streams and the walls of liquid-gaseous envelopes surrounding the gas streams.

Figure 3:
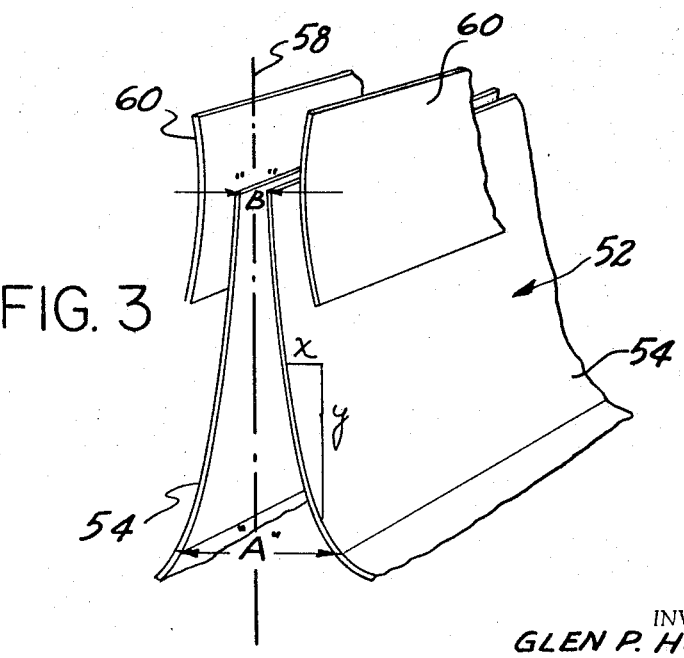
FIG. 3 is a fragmentary perspective view of the nozzles and liquid eductors used in the embodiments of FIGS. 1 and 2.

It has been found that highly efficient venturi action is accomplished if the nozzle structure sidewalls 54 are formed with a parabolic configuration. Referring to FIGS. 3, 4, and 5, the central flow axes of the nozzle structures 52 are represented by a center line or plane 58 and the nozzle walls 54 curve inwardly toward the center line by an increment $x$ for each increment $y$ taken along a line or plane parallel to the center line. The walls 54 are curved to conform to the parabolic relation $y = x^2$, which has been found to provide a very efficient nozzle and venturi action with a minimum of frictional losses. Maximum velocities in the range of 20,000 to 30,000 f.p.m. have been obtained with nozzle outlet slot widths B ranging from .05 to .20 inch, and these dimensions have proven very effiecient in operation of the venturi nozzles.

In order to guide and direct the liquid in the bath 36 to flow concurrently along opposite sides of the gas streams flowing out of the nozzles 52 for maximum entrainment by venturi action and to aid in the formation of the gaseous-liquid envelopes, a pair of inwardly concave liquid eductor vanes 60 are positioned adjacent the outlet of each of the nozzle structures 52. Each vane is positioned with its innermost concave portion closely spaced to the outer surface of an adjacent nozzle wall 54, and the lower portions of the vanes curve outwardly from the nozzle walls and extend into the liquid bath below the upper level 36a to provide a path for liquid in the bath to flow upwardly toward the nozzle outlet. The upper portions of the vanes curve outwardly from the central flow axes of the nozzle sections and aid in the formation of the expanding liquid-gaseous envelopes above the outlet slots of the nozzle sections. A low pressure region is developed in the gas streams adjacent the outlets of the nozzle structures, and liquid is drawn upwardly by venturi action from the lower levels of the liquid bath to flow between the vanes and their adjacent nozzle wall sections 54, as indicated by the arrows. The vanes aid greatly in producing the liquid-gaseous water envelopes and directionalize the liquid flowing from the bath into the gas streams in an efficient manner producing envelopes of greater surface area. The upper portions of the vanes 60 extend above the surface 36a of the liquid bath, and each pair of vanes is slightly divergent from one another to permit expansion of the gases in the streams and control the shape of the liquid-gaseous envelopes. The vanes maintain the opposing walls of each gaseous-liquid envelope in fairly close spaced relation to one another so that the envelopes do not break open or collapse immediately above the nozzle outlets and, accordingly, the gases in the streams are exposed to a larger surface area of liquid before the envelopes eventually collapse and break up into separate liquid droplets.

The nozzle structures 52 in the collector 10 are arranged with their central flow axes 58 converging to cross at a point above the liquid level 36a in the central portion of the housing. Consequently, the gaseous-liquid envelopes of opposing nozzle structures directly impinge on one another at high velocities, and the liquid and gas particles in opposing streams directly collide with one another. This action results in the breaking up of the envelopes at a relatively low height above the liquid bath without substantially reducing the wall areas of the envelopes. As the envelopes break up, intensive mixing of the gas and liquid medium results and a highly turbulent region develops which facilitates even further the entrapment of the contaminants in the liquid collecting medium. Liquid droplets containing large quantites of collected contaminants become heavy and gravitate back to the surface of the liquid bath, draining off through the opening 42.

The liquid in the bath 36 is continually agitated by the jet action of the gas streams and the contaminants therein have little chance to settle out and collect at the bottom on the pan 38. Fresh liquid is supplied through the line 40, and contaminated liquid is continually overflowing through the opening 42 and the drain 44.

Additional liquid is supplied to the contaminated gases entering the chamber below the liquid bath through a plurality of spray nozzle 62 positioned to direct a fine spray or mist and wet the gases entering the transition ducts 39. By wetting the gas before it enters the nozzle structures 52, a further increase in collection efficiency is obtained because of the intimate mixing between gas and liquid spray within the transition ducts and nozzle structures themselves. The end walls 50 of the transition ducts and the end walls 56 of the nozzle structures 52 are spaced slightly inwardly of the sidewalls 14 of the housing to permit liquid in the bath to flow into the central portion of the bath and completely surround the transition ducts and nozzle structures.

The cleaned gases above the liquid bath 36 move upwardly towards the outlet 16a in the housing and intermediately pass through a filter bed 64 wherein any remaining liquid droplets contained in the gas are collected. The filter bed 64 may comprise a plurality of speroidal filter elements as shown in United States Patent No. 2,645,304 or can be of a construction illustrated similar to that shown in the copending United States application Ser. No. 456,927, filed May 19, 1965. In the illustrated embodiment, the filter bed comprises a plurality of rod elements 66 arranged in parallel planes extending transversely across the housing 12. Several succeeding planes or layers of rods are provided, and the rods in each plane are spaced in parallel relation with one another. The rods in each plane are staggered in relation to the rods in adjacent planes so that each rod overlies a space between two adjacent rods in the adjacent plane below. Spacing between the rods is accomplished by means of tubular end sleeves 68 of selected wall thickness which are inserted onto the opposite ends of each rod. The sleeves 68 on the lower layer of rods 66 bear upon the flanges of a pair of lower support angles 70, only one of which is shown, secured to opposite sidewalls 14 of the housing. The sleeves on each succeeding layer of rods bear on the sleeves of the next lower layer of rods and maintain and support the rods in stacked relation. The spaces between the rods define many diverse tortuous path for the upwardly traveling gases, and the liquid droplets still contained therein wet and collect on the surfaces of the rods and eventually return by gravity to the liquid bath 36. The uppermost layer of rods in the filter bed 64 is held in position and compressed downward against the lower layers by means of a pair of removable clamping angles 72, only one of which is shown. The angles are secured to opposing sidewalls of the housing by a plurality of wing nut assemblies 74, and when the wing nut assemblies are loosened, the clamping members 72 can be removed. Once the clamping angles are loosened, the rods 66 can be individually removed from the housing for cleaning and replacement through an access opening 76 provided in sidewall 14. A removable access door 78 is provided to cover the opening 76 and seal the housing, once the rods are properly positioned and clamped in place. Operation of the filter bed 64 is described in more detail in the aforementioned copending United States patent application Ser. No. 456,927, filed May 19, 1965, and reference should be had to this application to appreciate more fully the filter operation.

FIG. 2 illustrates another embodiment of the invention wherein the outlet ends of the nozzle structures 52 extend upwardly above the upper level 36b of the liquid bath 36. The liquid eductor vanes 60 are arranged so that the lower edge portions thereof extend downwardly into the liquid below the upper level thereof. In this arrangement, the low pressure region at the outlets of the nozzles 52 draws the liquid upwardly by venturi action from the liquid bath for entrainment in the gas streams. Because the lower edges of the vanes 60 are below the upper liquid level in the bath, good suction is obtained by the venturi action of the nozzles and good entrainment of the liquid is obtained. By positioning the nozzle outlets slightly above the upper level of the liquid bath, the liquid will not drain downwardly through the nozzles when the collector is not in operation and, consequently, there is very little if any loss of liquid during shutdown periods.

In both of the embodiments illustrated in FIGS. 1 and 2, the liquid collecting medium from the liquid bath is entrained into the gas streams by venturi action adjacent the nozzle outlets which are the regions of highest gas flow velocity. The eductor vanes aid in directing the liquid for entrainment and in shaping and forming the liquid-gaseous envelopes above the nozzle outlets. The intense mixing action at the throat of the venturis between the gas and liquid provides for highly efficient collection of the gas contaminants because the liquid droplets are very finely divided by the venturi action.

FIG. 5 illustrates another embodiment of a nozzle and eductor vane and baffle arrangement which may be utilized in the dust collector 10 when only a single rather than a pair of nozzles is needed to accommodate the gas flow. In addition to the nozzle structures 52 and liquid eductor vanes 60, an impingement baffle 80 of angular configuration is positioned above the outlet slot of the nozzle. The apex of the baffle is centered along the plane 58 or flow axis of the nozzle structure and a pair of deflecting surfaces 82 extend upwardly and outwardly on either side thereof. The upwardly flowing gas stream from the nozzle structure 52 and the liquid-gaseous envelope surrounding the stream strikes the baffle 80 and is deflected into two separate branches moving outwardly along the surfaces 82. Liquid droplets collect on these surfaces and return to the apex of the baffle and then drop downwardly into the center of the gas stream to collect additional contaminants therein. Other liquid droplets move outwardly of the central plane 58 and eventually gravitate back to the liquid bath 36. When only a single, vertically extending nozzle 52 is needed, or when several vertical, rather than sloping, nozzles are used, the baffle 80 above the nozzle is effective to reduce the vertical space required above the liquid bath within the collector because the baffle directs the upwardly flowing liquid-gaseous envelopes above the nozzle outwardly in opposite, somewhat horizontal directions along the upper surface of the liquid in the bath.

Where a pair of sloping opposed nozzle structures are utilized, as illustrated in the previous embodiments of FIGS. 1, 2, 3, and 4, baffles may be utilized but are not necessarily required because of the action of the pair of opposed, directly impinging, converging streams.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. Apparatus for separating contaminants from contaminated gas, comprising a housing defining a flow path therethrough and having an inlet for said contaminated gas and an outlet for purified gas, a liquid bath in said housing extending across said flow path between said inlet and outlet and containing a quantity of contaminant collecting liquid medium having a selected upper level, gas passage means in said liquid bath for directing said contaminated gas in high velocity streams to entrain said liquid in said stream, said passage means including a pair of opposed nozzles having upwardly converging central axes intersecting above said liquid bath, each of said nozzles having an inlet end in communication with the inlet of said housing and an upper outlet end adjacent the upper liquid level of said liquid bath, each of said nozzles comprising a pair of opposed converging sidewalls curving inwardly toward one another from said inlet end and reaching a minimum spacing adjacent the upper outlet end thereof, and a pair of inwardly concave liquid eductor vanes disposed to extend adjacent the upper outlet end of each of said nozzles for guiding the liquid medium in said bath to flow in a concurrent direction with said gas stream prior to entrainment of the liquid in the gas stream at the outlet end of the nozzle, each of said vanes including a concave central portion spaced adjacent the outlet end of an adjacent nozzle and upper and lower portions curving outwardly in relation to the central axis of said adjacent nozzle, said lower portion having a lower edge disposed below the upper liquid level in said bath and said upper portion extending above the upper liquid level in said bath.

2. Apparatus as defined in claim 1 wherein said outlets of said nozzles extend slightly above the upper level in said liquid bath.

3. In combination with a liquid bath having an upper level, nozzle means in said bath for directing a high velocity stream of gas to entrain liquid from said bath, said nozzle means comprising a pair of opposed converging sidewalls curving inwardly toward one another from an inlet end, said walls having upper ends closely spaced from one another forming a narrow discharge outlet smaller than said inlet end and disposed adjacent the upper level of liquid in said bath, a pair of liquid eductor vanes on opposite sides of said outlet for guiding said liquid medium in the bath to flow in a concurrent direction with said gas stream prior to entrainment therein adjacent the outlet end of said nozzle, each of said vanes including a central concave portion spaced adjacent said outlet and outwardly curving lower and upper portions, said lower portion including a lower edge disposed below the upper level of liquid in said bath.

4. A method of separating contaminants from gas, comprising the steps of accelerating said gas into a pair of converging, high velocity gas streams for discharge adjacent the upper level of a liquid bath of contaminant containing liquid medium, introducing said liquid medium in said high velocity gas streams to wet the contaminants therein, discharging said high velocity gas streams into an expansion area above said bath whereby the gas velocity is reduced and the liquid medium separated from the gas, positioning said discharging gas streams in converging directions to directly intersect and impinge upon one another above said liquid bath and guiding said liquid medium into said gas streams to form a pair of liquid-gaseous envelopes around said discharging gas whereby said envelopes directly impinge and intersect one another.

References Cited

UNITED STATES PATENTS

| | | | |
|---|---|---|---|
| 1,583,141 | 5/1926 | Greenawalt | 261—124 |
| 1,708,179 | 4/1929 | Hurt | 261—121 |
| 1,741,519 | 12/1929 | Huff | 261—116 X |
| 1,868,632 | 7/1932 | Edge | 261—116 |
| 1,983,422 | 12/1934 | Voorhees | 261—121 X |
| 2,809,821 | 10/1957 | Constantikes | 261—114 |
| 2,832,432 | 4/1958 | Fanton | 55—225 |
| 3,233,881 | 2/1966 | Smith | 261—114 X |

FOREIGN PATENTS 420,068  10/1929  Great Britain.

REUBEN FRIEDMAN, *Primary Examiner.*

J. ADEE, *Assistant Examiner.*